Aug. 9, 1955  L. B. GREEN  2,714,916
WORK GRIPPING AND FLEXING CHUCK MECHANISM
Filed Dec. 3, 1952  3 Sheets-Sheet 1

INVENTOR.
LEE B. GREEN
BY
Hudson, Boughton,
Williams, David & Hoffmann
ATTORNEYS Aug. 9, 1955     L. B. GREEN     2,714,916
WORK GRIPPING AND FLEXING CHUCK MECHANISM
Filed Dec. 3, 1952     3 Sheets-Sheet 2
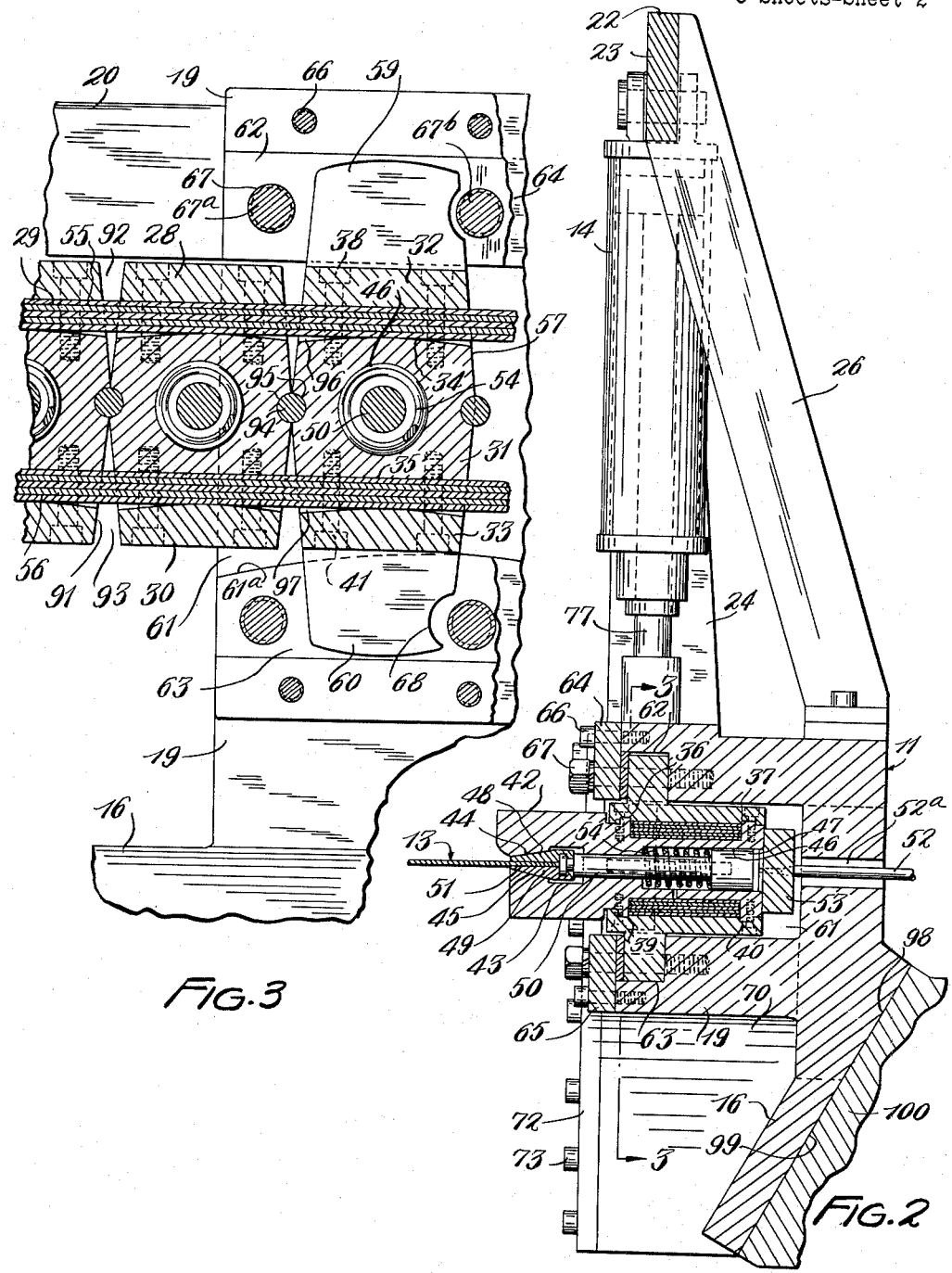
INVENTOR.
LEE B. GREEN
BY Hudson, Doughton,
Williams, David & Hoffmann.
ATTORNEYS Aug. 9, 1955     L. B. GREEN     2,714,916
WORK GRIPPING AND FLEXING CHUCK MECHANISM
Filed Dec. 3, 1952     3 Sheets-Sheet 3
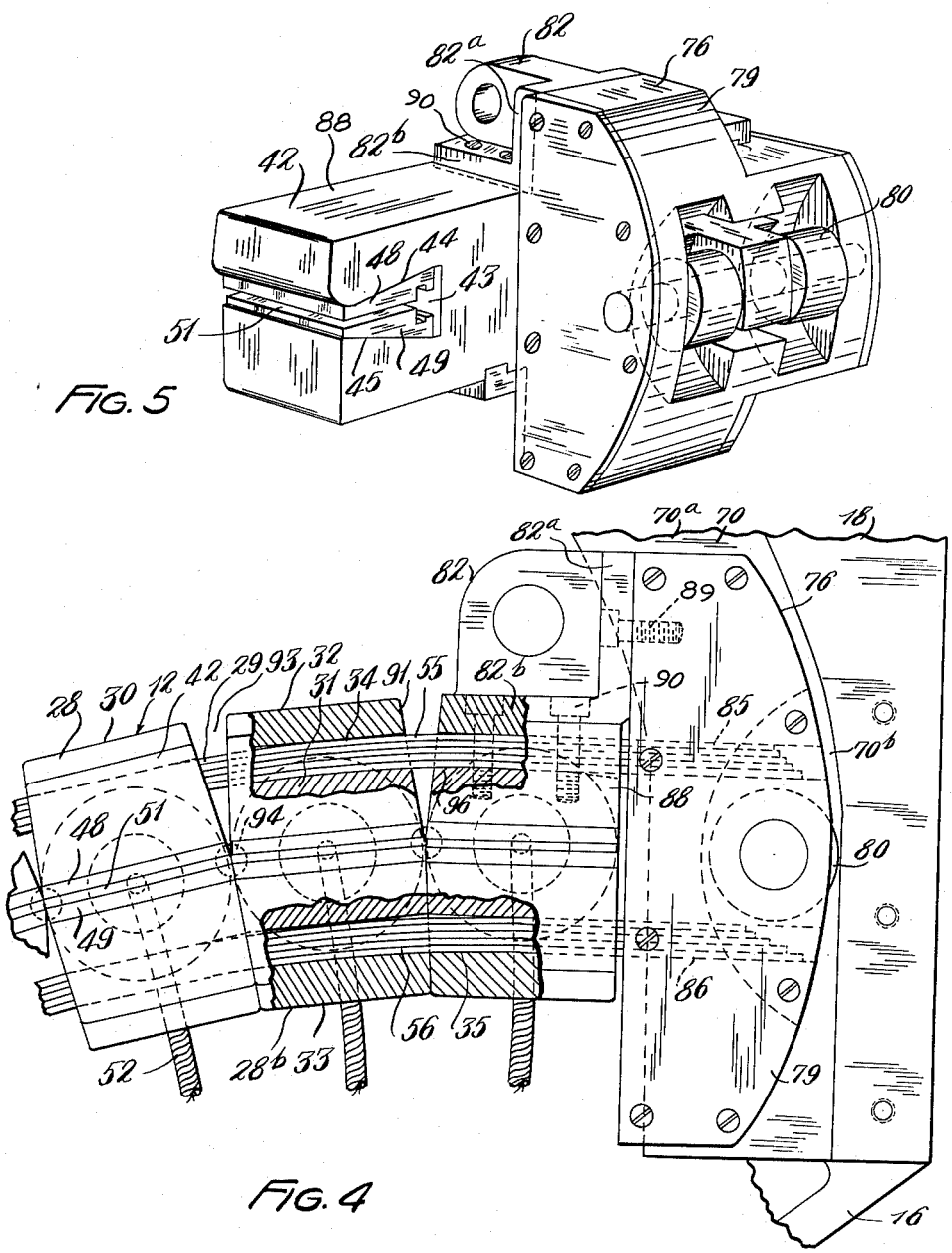
INVENTOR.
LEE B. GREEN
BY Hudson, Boughton,
Williams, David & Hoffmann.
ATTORNEYS United States Patent Office 2,714,916
Patented Aug. 9, 1955

2,714,916
WORK GRIPPING AND FLEXING CHUCK MECHANISM

Lee B. Green, Lakewood, Ohio

Application December 3, 1952, Serial No. 323,809

15 Claims. (Cl. 153—35)

This invention relates to chuck mechanisms of the kind intended to grip a metal workpiece on which an operation is to be performed and, as one of its objects, aims to provide a novel chuck mechanism having a flexible work gripping means.

Another object is to provide a novel chuck mechanism having a work gripping means comprising a transversely flexible series of gripping units.

A further object is to provide a novel chuck mechanism comprising a gripping means formed by such a transversely flexible series of gripping units, and actuating means effective to cause a transverse flexing of the gripping means while the latter is in engagement with a workpiece.

Still another object is to provide a novel chuck mechanism having an elongated transversely flexible work gripping means, and in which the flexible gripping means comprises a series of gripping units and a flexible connecting means extending longitudinally of the series and connecting the units thereof.

Yet another object is to provide such a novel chuck mechanism in which the flexible connecting means is a plate spring means, preferably of the leaf spring type.

As another object, this invention provides chuck mechanism of the character mentioned, in which the gripping units are provided with jaw means located substantially on the neutral axis of the series and in which the flexible connecting means comprises flexible connecting members extending longitudinally of the series on opposite sides of the neutral axis.

It is, likewise, an object of this invention to provide a novel chuck mechanism in which plate spring means forming a transversely flexible beam, supports a series of gripping units in an adjacent relatively movable relation to each other.

Another object is to provide novel chuck mechanism of the kind above referred to in which the transversely flexible work gripping means is connected at one point thereof with a support and is engaged at another point thereof by an actuating means to cause the transverse flexing of the gripping means.

Additionally, this invention provides a novel work gripping and flexing chuck mechanism of the character above indicated in which the point of connection of the transversely flexible gripping means with the support is an intermediate point of the gripping means and in which guide followers movable along spaced guideways of the support, impart flexing movement to the end portions of the flexible gripping means.

Still another object is to provide novel chuck mechanism of the character mentioned in which the gripping units are block-like members having chamfered sides, and in which fulcrum means disposed between pairs of the block-like members renders each member rockable relative to the adjacent member.

The invention can be further briefly summarized as consisting in certain novel combinations and arrangements of parts hereinafter described and particularly set out in the claims hereof.

In the accompanying sheets of drawings, forming a part hereof:

Fig. 2 is a vertical section, taken through the mechanism substantially as indicated by section line 2—2 of Fig. 1;

Fig. 3 is a fragmentary vertical section taken substantially as indicated by section line 3—3 of Fig. 2 and showing a portion of the mechanism on a larger scale;

Fig. 4 is a partial front elevation on a larger scale and showing the cooperation of one end of the flexible gripping means with one of the guideways of the support; and Fig. 5 is a perspective view of one of the guide followers and an associated gripping unit and showing the guide follower removed from its guideway.

Figure 1:
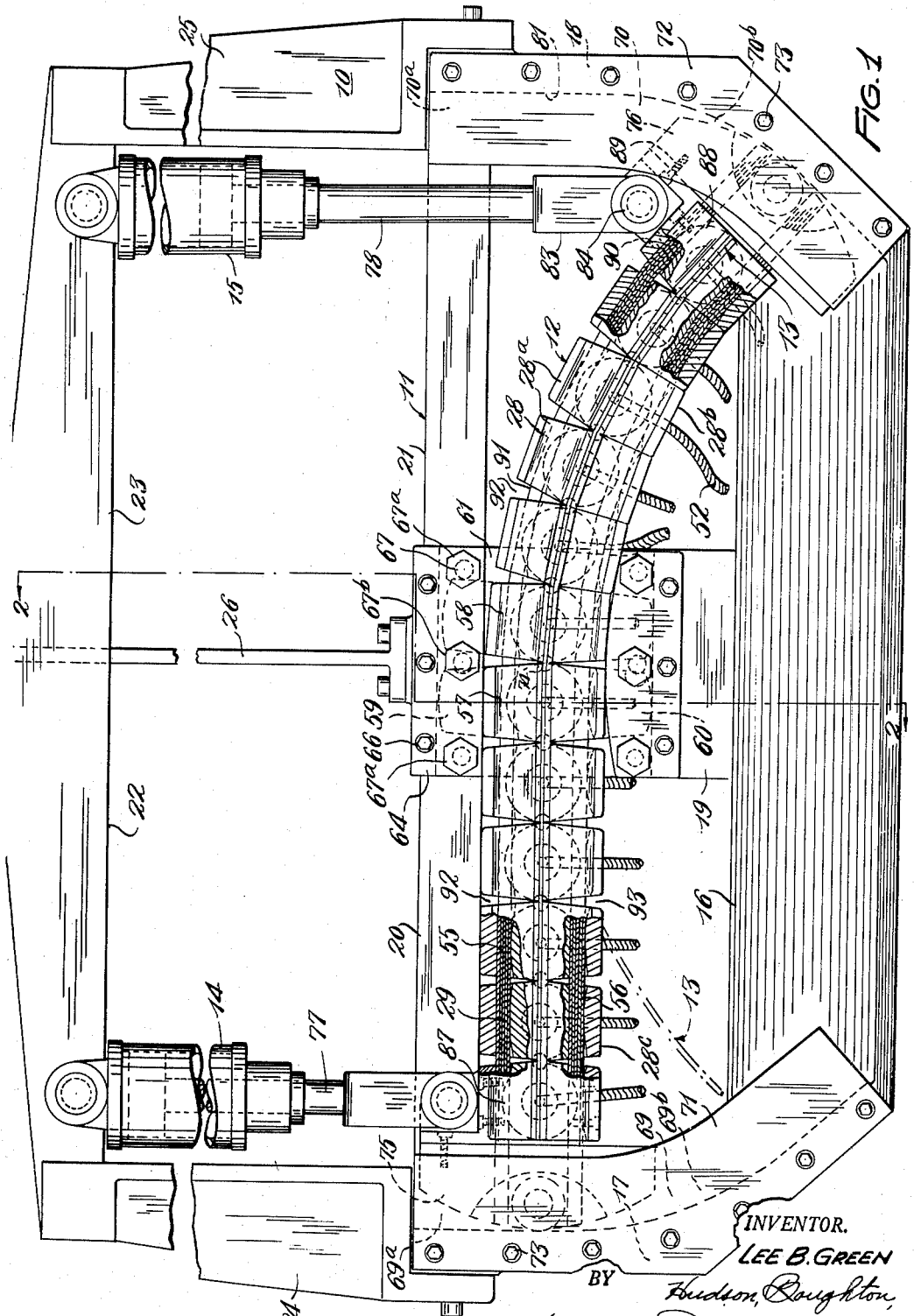
Fig. 1 is a front elevation of a chuck mechanism embodying the present invention and showing the mechanism with certain portions thereof broken away.

The novel work gripping and flexing chuck mechanism 10 is shown in the drawings as comprising, in general, a frame structure or support 11 and an elongated transversely flexible gripping means 12 which is engageable with a metal sheet 13 or other workpiece on which a metal working operation is to be performed. The chuck mechanism 10 also comprises an actuating means for causing the transverse flexing of the work gripping means 12 and which, in this instance, is shown as comprising a pair of power cylinder devices 14 and 15 connected between the support 11 and the end portions of the flexible gripping means.

The frame structure or support 11 comprises a laterally extending base 16 having a pair of upright arm portions 17 and 18 carried thereby and connected with the ends thereof. At a point substantially midway between the arms 17 and 18, the base 16 is provided with an upright head 19. The upper end of the head 19 is connected with the upper ends of the arms 17 and 18 by cross bars 20 and 21. The support 11 also comprises an arched bridge member 22 forming a mount for the cylinder devices 14 and 15 and which includes a cross bar 23 and a pair of depending sides or posts 24 and 25 which are connected, respectively, with the arms 17 and 18 of the base 16. The cross bar 23 can be supported at an intermediate point thereof as by the inclined brace arm 26 depending therefrom and having its lower end bolted, or otherwise secured, to the head 19.

The flexible gripping means 12 comprises a longitudinal series of gripping units 28 disposed in side-by-side relation in a laterally extending row, and flexible connecting means 29 extending longitudinally of the series and connecting the gripping units so as to render the series flexible transversely thereof. The gripping units 28 each comprises a block-like body 30 which, in this instance, is formed by connected sections, namely, a body section 31 and a pair of top and bottom cover sections 32 and 33.

The body section 31 is provided in the top and bottom thereof with cross slots or recesses 34 and 35 to accommodate the flexible connecting means 29, and the sections 32 and 33 constitute cover or clamping members which extend in bridging relation to these slots. The upper cover section 32 is connected with the body section 31 by being secured against a pair of shoulders 36 and 37 of the latter by means of the screws 38. The bottom cover section 33 is connected with the body section 31 by being secured against a pair of shoulders 39 and 40 of the latter by means of the screws 41.

Each of the gripping units 28 also comprises a forwardly projecting chuck head 42 which is carried by or formed integral with the body section 31 and which has a transverse dovetail slot or gap 43 therein. The chuck head 42 also has a transverse access slot communicating with the recess 43 and defined by a pair of relatively inclined inwardly diverging wedge faces 44 and 45.

Each of the gripping units 28 is also provided with a plunger chamber or cylinder bore 46 formed in the body section 31 and a plunger or piston 47 reciprocably operable in such bore. A pair of work gripping jaws 48 and 49 are connected with the piston 47 by a piston rod 50 and define a guide slot 51 therebetween in which an edge portion of the workpiece to be gripped, such as the metal sheet 13, is received.

Actuating fluid, such as a hydraulic pressure fluid, is adapted to be supplied to the cylinder 46 through a conduit 52 which communicates with the cylinder chamber through the cylinder cover 53. Actuation of the piston 47 by such pressure fluid causes the jaws 48 and 49 to be advanced between the wedge surfaces 44 and 45 which results in a closing of the jaws into gripping engagement with the workpiece 13. When the pressure fluid is released from the cylinder 46, a compression spring 54 located in the cylinder in surrounding relation to the piston rod 50, imparts a return stroke movement to the piston and retracts the jaws 48 and 49 from the wedge surfaces 44 and 45, such that the jaws will have an opening movement for releasing the gripping engagement with the workpiece.

As shown in the drawings, the paired jaws 48 and 49 of the gripping units 28 extend across these units such that they are in an aligned relation longitudinally of the series and are located substantially on the neutral longitudinal axis of the series. By reason of the side-by-side relation of the gripping units 28, the paired jaws 48 and 49 will define a substantially longitudinally continuous gripping means of which the jaws of the individual units will have gripping engagement with corresponding adjacent edge portions of the workpiece 13.

The flexible connecting means 29 is preferably, though not necessarily, a plate spring means which, in addition to forming a connecting means for the gripping units 28, also forms a support for various ones of these gripping units. The connecting means 29 is here shown as comprising a pair of upper and lower leaf springs 55 and 56 extending longitudinally of the series of gripping units 28 and located on opposite sides of the longitudinal neutral axis of the series. The upper spring 55 extends through the upper cross slots 34 and beneath the upper covers 32 of the gripping units 28 and the lower spring 56 extends through the lower cross slots 35 and above the lower covers 33 of the units.

The gripping units of the flexible gripping means 12 include a pair of gripping units 57 and 58 at the midpoint of the series which are of a somewhat different construction than the other gripping units of the series, in that they also serve as a means for connecting the midpoint of the flexible gripping means with the support 11. For this purpose, the center units 57 and 58 of the series are provided with upper and lower lug projections 59 and 60 which are here shown as being formed by integral portions of the upper and lower cover sections 32 and 33. In the case of center units 57 and 58, the pressure fluid supply conduits 52 extend through passages 52ª provided in the head 19 at the rear thereof.

The head 19 of the support 11 is provided with a transverse recess 61 which extends thereacross laterally of the support 11 and accommodates the flexible gripping means 12. The recess 61 includes upper and lower slot extensions 62 and 63 which also extend across this head. The center units 57 and 58 of the flexible gripping means 12 are disposed in the recess 61 of the head 19 with the upper and lower extension lugs 59 and 60 extending into the slot extensions 62 and 63. These slot extensions are formed in part by upper and lower bearing plates 64 and 65 which are secured to the head 19 by the screws 66 and retain the lugs 59 and 60 in the slots 62 and 63. The portion of the head 19 which defines the bottom wall 61ª of the recess 61 is chamfered or curved, as shown in Figs. 1 and 3, to prevent interference with the gripping means 12 when the latter is flexed downwardly.

The engagement of the lugs 59 and 60 of the center units 57 and 58 in the slots 62 and 63 of the head 19, connects the intermediate portion of the gripping means 12 with the support 11, such that the oppositely extending end portions of the gripping means will remain free for the desired transverse flexing or bending thereof. In the connection thus formed between the intermediate portion of the gripping means 12 and the support 11, the center units 57 and 58 have a limited amount of relative movement in the head 19 by a relative rocking or sliding of the lugs 59 and 60 in the slots 62 and 63. The extent of this relative movement of the center units 57 and 58 in the head 19, is determined by a plurality of stop members which are here shown as being in the form of screws 67 extending into the head through the bearing plates 64 and 65.

The stop screws 67 include pairs of outer screws 67ª located on the remote sides of the center units 57 and 58, and center screws 67ᵇ located between these center units. The engagement of the lugs 59 and 60 of the center units with the stop screws 67, prevent the center units 57 and 58 from moving out of the head 19 in a direction endwise of the series. If desired, the lugs 59 and 60 can be provided with notches 68 in the edges thereof at the point of their engagement with the stop screws 67 for determining the desired amount of clearance therebetween.

The upright arms 17 and 18 of the support 11 are provided with guideways 69 and 70 on the sides thereof facing the head 19 and which guideways are formed in part by cover plates or gibs 71 and 72 secured to these arms by screws 73. The guideways 69 and 70 are here shown as having substantially straight upper portions 69ª and 70ª which extend vertically in substantially parallel relation to each other. These guideways are also formed with inwardly curved portions 69ᵇ and 70ᵇ which constitute downward extensions of the straight or parallel portions 69ª and 70ª. The curved portions 69ᵇ and 70ᵇ lie at substantially the same distance from the midpoint 74 of the series of gripping units and corresponds substantially with arcs defined by radial lines swung from this midpoint as a center.

The chuck mechanism 10 also includes a pair of guide followers 75 and 76 which are movable in the guideways 69 and 70 and are actuated therein by being connected with the piston rods 77 and 78 of the above-mentioned power cylinder devices 14 and 15. The guide followers 75 and 76 are shown as each comprising a block-like body 79 having a pair of rollers 80 pivotally mounted thereon for antifriction engagement with the outer or bottom walls 81 of the guideways 69 and 70. The blocks 79 of the guide followers are adapted for connection with the piston rods of the power cylinder devices 14 and 15 by being provided with an eye portion 82 to which the piston rod yokes 83 are connected by pivot pins 84. The blocks 79 are also provided with a pair of vertically spaced cross slots 85 and 86 extending therethrough and in which the ends of the leaf springs 55 and 56 slidably engage for connecting these springs with the guide followers.

The gripping units of the flexible gripping means 12, include outer end units 87 and 88 which differ from the other units of the series in that these end units are rigidly secured to the guide follower blocks 79. This attachment of the end blocks 87 and 88 with the guide followers is here accomplished by constructing the eyes 82 with angular bracket portions 82ª and 82ᵇ of which the bracket portion 82ª is connected with the follower block 79 by screws 89 and the bracket portion 82ᵇ is connected to an end member of the series by the screws 90. The bracket portion 82ᵇ also forms the top cover section of the end gripping units 87 and 88.

From the construction of the chuck mechanism 10 as thus far described, it will be seen that the leaf springs 55 and 56 constitute flexible beams which support the gripping units 28ª which are located between the center units 57, 58 and the end units 87, 88, and have their free ends extending outwardly away from the midpoint 74. The free ends of these flexible beams are anchored on the guide followers 75 and 76 by engagement in the cross slots 85 and 86 and when a flexing movement is imparted to these outer end portions of the beams by movement of the followers in the guideways 69 and 70, the gripping means 12 will be flexed transversely thereof. The end portions of the gripping means 12 can be thus flexed independently of each other to the bowed condition of the end portion 28ᵇ of the gripping means as shown in Fig. 1, or can be returned independently of each other to the substantially straight line condition of the end portion 28ᶜ, by selective actutaion of the power cylinder devices 14 and 15.

This flexing of the end portions 28ᵇ and 28ᶜ of the gripping means 12 is usually done after the gripping units 28 have been engaged with the workpiece 13, such that the flexing of the gripping means will cause a corresponding transverse bending of the workpiece, as for example, a bending of the workpiece to the transversely bowed condition shown in Fig. 1. The flexing of the gripping means 12, which restores the same to its initial straight line condition, is for the purpose of preparing the gripping means for engagement with another of the workpieces. Although the flexing of the gripping means 12 is usually done in connection with a transverse bending being thereby produced in the workpiece, the flexing can also be merely for the purpose of aligning the gripping means with the edge portion of the metal sheet or other workpiece which is to be gripped.

To accommodate the above-described transverse flexing of the gripping means 12, the block-like units 28 thereof are provided with convergently beveled sides as indicated at 91, which define substantially triangular or wedge-shaped upper and lower clearance spaces 92 and 93 between adjacent units. When an end portion of the gripping means is flexed to the downwardly bowed condition of the end portion 28ᵇ, the lower clearance spaces 93 are decreased in width or disappear entirely, as shown in Fig. 1.

To further provide for the relative rocking movement which occurs between the adjacent units 28 of the series of gripping units during transverse flexing of the series, a fulcrum means is provided between adjacent units. This fulcrum means is here shown as comprising a fulcrum member in the form of a roller or pin 94 disposed between each pair of gripping units 28, and complemental semicylindrical grooves 95 in such adjacent units. The grooves 95 and the fulcrum members 94 engaging therein, all lie substantially on the longitudinal neutral axis of the series of gripping units.

The fulcrum members 94 permit a relatively free rocking of each unit on its adjacent unit and also assist the springs 55 and 56 in maintaining the units in properly aligned relation longitudinally of the series. In connection with this relative rocking of the units 28 of the gripping means 12, it is pointed out that interference beween the bodies of the gripping units and the leaf spring 55 is prevented by providing the body sections 31 with curved relief chamfers 96 which impart increased vertical width to the cross slots 34 adjacent the edges thereof. Similarly, curved relief chamfers 97, formed on the bottom cover sections 33 provide increased vertical width for the lower cross slots 35 at the edges thereof to prevent interference with the lower leaf spring 56.

The chuck mechanism 10 can be used for various purposes, but is particularly well suited for use in connection with stretch bending operations to be performed on a metal workpiece, such as the metal sheet 13. When used in connection with stretch bending work, the chuck mechanism 10 would constitute one or both of the work gripping units of a stretch bending machine, such as the machines disclosed in copending applications Serial No. 305,377, filed August 20, 1952, and Serial No. 323,257, filed November 29, 1952, now Patent 2,692,634, granted October 26, 1954.

To adapt the chuck mechanism 10 for use on such a stretch bending machine, the base 16 of the support 11 is provided with a substantially flat clamping surface 98 which is adapted to be secured against a corresponding surface 99 of a movable carrier 100 by suitable bolts or studs. The member 100 may also be any other form of movable carrier for the chuck mechanism 10 when this mechanism is intended for use other than as a part of a stretch bending machine.

From the foregoing description and the accompanying drawings, it will now be readily understood that this invention provides a novel form of work gripping and flexing chuck mechanism which includes a transversely flexible or articulated work gripping means. It will also be seen that the flexible work gripping means of this novel chuck mechanism is adapted to be flexed while in engagement with a workpiece for the purpose of causing a transverse bending of such workpiece to a desired shape.

Although the novel chuck mechanism has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In work gripping mechanism, a plurality of gripper units each comprising a body having an axially extending plunger chamber and a pair of grip jaws at one end of said body and actuated by a plunger movable in said chamber, said units being rockable relative to each other and being disposed in a row with their plunger chamber axes in substantially parallel relation, and flexible connecting means substantially coextensive with said row and connecting said units for flexing of said row transversely thereof by such relative rocking between said units.

2. In work gripping mechanism, a plurality of gripper units each comprising a body having a work gripping means thereon including a pair of plunger actuated gripping jaws, said bodies being disposed in a series and being rockable relative to each other, and plate spring means flexibly connecting said bodies for said relative rocking.

3. In a chuck mechanism, a plurality of gripper units provided with plunger actuated jaw means for gripping a workpiece, said units being disposed in a series with adjacent units rockably fulcrumed on each other for flexing of the series transversely thereof, the gripping means of said units being substantially in alignment so as to extend along the series on one side thereof, and flexible connecting means extending longitudinally of said series and maintaining said units in such rockably fulcrumed relation.

4. In a chuck mechanism, a plurality of gripper units disposed in a series and provided with means for gripping a workpiece including plunger actuated jaw means on the respective units, fulcrum members disposed between said units and rendering adjacent units rockable on each other, said fulcrum members being disposed substantially on the neutral axis of said series, and flexible connecting members connecting said units and extending longitudinally of said series on opposite sides of said neutral axis.

5. In a chuck mechanism, a plurality of bodies disposed in a longitudinal series, plunger actuated jaw means carried by said bodies and adapted for gripping engagement with a workpiece, fulcrum members disposed between said bodies and rendering adjacent bodies rockable on each other, said jaw means and fulcrum members being disposed substantially on the neutral axis of said series, and flexible connecting members connecting said bodies and extending longitudinally of said series on opposite sides of said neutral axis.

6. In chuck mechanism, a support, plate spring means connected with said support and forming a flexible beam, a plurality of work gripping units disposed in a series and supported by said beam, said units being tiltable relative to each other during flexing of said beam and each unit comprising a body having a plunger actuated jaw means thereon, and actuating means operable to cause flexing of said beam for varying the direction in which said series extends.

7. In a work gripping mechanism, a support, a plurality of gripper units each comprising a body having a plunger actuated work gripping jaw means thereon, said bodies being disposed in a series and being rockable relative to each other, flexible connecting means connecting said bodies and providing for flexing of said series transversely thereof, and means connecting said series at an intermediate point thereof with said support, portions of said series outwardly of said intermediate point being swingable to different positions by flexing of said flexible connecting means and relative rocking between said bodies.

8. In chuck mechanism, a support, plate spring means connected at an intermediate point thereof with said support and having end portions defining substantially oppositely extending flexible beam members, work gripping units mounted on said beam members and extending in a row therealong, and actuating devices connected with said beam members adjacent the ends thereof and adapted to cause flexing of said beam members for varying the direction in which said row extends.

9. In a work gripping mechanism, a support, a plurality of gripper units each comprising a body having a work gripping means thereon, said bodies being disposed in a series and being rockable relative to each other, flexible connecting means connecting said bodies and providing for flexing of said series transversely thereof, means connecting said series at one point thereof with said support, means on said support defining a curved guideway, and follower means movable along said guideway and connected with said series at another point of the latter, said guideway having its curvature defined substantially by a radius swung from said one point.

10. In a work gripping and flexing chuck mechanism, a support, a plurality of gripper units each comprising a body having a work gripping means thereon, said bodies being disposed in a series and being rockable relative to each other, plate spring means connecting said bodies and providing for flexing of said series transversely thereof, means connecting said series at one point thereof with said support, means on said support defining a guideway, follower means movable along said guideway and connected with said series at another point of the latter, and a power device on said support and having operative connection with said follower means for imparting movement thereto.

11. In a work gripping and flexing chuck mechanism, a support, a plurality of gripper units each comprising a body having a work gripping means thereon, said bodies being disposed in a side-by-side relation in a longitudinal series, fulcrum members between said bodies and rendering adjacent bodies rockable relative to each other, flexible longitudinally extending connecting members connecting said bodies and providing for flexing of said series transversely thereof said fulcrum members and the gripping means of said units being disposed substantially on the neutral axis of said series and said connecting members being disposed on opposite sides of said neutral axis, means connecting said series at an intermediate point thereof with said support, means on said support defining a pair of spaced guideways, followers movable along said guideways and having the outer ends of said series connected therewith, and power devices on said support and connected with said followers for moving the latter along said guideways.

12. In a work gripping and flexing chuck mechanism, a support, a plurality of gripper units each comprising a body having a work gripping means thereon, said bodies being disposed in a series and being rockable relative to each other, plate spring means connecting said bodies and providing for flexing of said series transversely thereof, means connecting said series at an intermediate point thereof with said support, means on said support defining a pair of spaced guideways, followers movable along said guideways and having the outer ends of said series connected therewith, and power devices on said support and operably connected with said followers and effective to move the latter along said guideways.

13. Work gripping and flexing chuck mechanisms as defined in claim 12 in which said guideways include curved portions and in which the spacing of the curved portions of said guideways from said one point is such as to prevent any substantial separation between said bodies during flexing of said series.

14. In chuck mechanism of the character described, a support adapted for connection with a movable carrier, a plurality of block members disposed in a longitudinal series, a pair of relatively movable work gripping jaws carried by each block member and adapted to grip an edge portion of a workpiece, fulcrum means between said block members and rendering adjacent block members rockable on each other, flexible connecting means extending longitudinally of said series and connecting said block members in such rockably fulcrumed relation for flexing of said series transversely thereof, means connecting said series at a substantially central point thereof with said support, a pair of spaced guideways on said support and including convergently curved guideway portions located at radial distances from said central point, followers connected with the end portions of said series and movable along said guideways, and power cylinder devices connected between said support and said followers and effective to cause movement of the latter along said guideways for deflecting the end portions of said series while said gripping jaws are in engagement with a workpiece.

15. In a chuck mechanism, a support, a plurality of gripping units each comprising a body having a work gripping means thereon, said bodies being disposed in a side-by-side relation in a longitudinal series, fulcrum means between said bodies and rendering adjacent bodies of the series rockable relative to each other, longitudinally extending leaf springs connecting said bodies and providing for flexing of said series transversely thereof, said fulcrum members and the gripping means of said units being disposed substantially on the neutral axis of said series and said leaf springs being disposed on opposite sides of said neutral axis, at least one of said bodies in the intermediate portion of said series having holding portions thereon, means engaging said holding portions for connecting the intermediate portion of said series with said support while end portions of the series are movable relatively to said support, means on said support defining a pair of spaced convergently inclined guideways, end members connected with the ends of said leaf springs and movable along said guideways for imparting the transverse flexing to said end portions of the series, and power devices on said support and connected with said end members for moving the latter along said guideways.

References Cited in the file of this patent

UNITED STATES PATENTS

| Number | Name | Date |
|---|---|---|
| 401,509 | Mitchell | Apr. 16, 1889 |
| 457,073 | Cliff | Aug. 4, 1891 |
| 650,049 | Lynch | May 22, 1900 |
| 1,264,249 | Yoder | Apr. 30, 1918 |
| 1,351,472 | Farmer | Aug. 31, 1920 |
| 1,654,697 | Mueller | Jan. 3, 1928 |
| 1,666,380 | Heinle | Apr. 17, 1928 |
| 2,177,726 | Kortvelesy | Oct. 31, 1939 |
| 2,218,503 | Brooks | Oct. 22, 1940 |
| 2,279,964 | Berliner | Apr. 14, 1942 |
| 2,292,731 | Amiot | Aug. 11, 1942 |
| 2,381,657 | Eksergian | Aug. 7, 1945 |
| 2,459,132 | Nielsen | Jan. 11, 1949 |
| 2,522,319 | Tinley | Sept. 12, 1950 |
| 2,547,870 | Kelso | Apr. 3, 1951 |
| 2,609,860 | Kindelberger | Sept. 9, 1952 |
| 2,692,634 | Green | Oct. 26, 1954 |